(12) United States Patent
Vummidi Murali et al.

(10) Patent No.: US 10,496,209 B2
(45) Date of Patent: Dec. 3, 2019

(54) PRESSURE-BASED FORCE AND TOUCH SENSING

(71) Applicant: Apple Inc., Cupertino, CA (US)

(72) Inventors: Krishna Prasad Vummidi Murali, Sunnyvale, CA (US); Hari Vasudevan, Los Gatos, CA (US); Michael A. Lehr, Mountain View, CA (US); Wesley S. Smith, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/812,048

(22) Filed: Nov. 14, 2017

(65) Prior Publication Data

US 2018/0284936 A1    Oct. 4, 2018

Related U.S. Application Data

(60) Provisional application No. 62/480,105, filed on Mar. 31, 2017.

(51) Int. Cl.
*G06F 3/041* (2006.01)

(52) U.S. Cl.
CPC .......... *G06F 3/0414* (2013.01); *G06F 3/0416* (2013.01)

(58) Field of Classification Search
CPC .... G06F 3/0414; G06F 3/0418; G06F 3/0416; G06F 3/045; G01L 1/00; G01L 1/02; G01L 1/083; G01L 25/00; G04G 21/00
See application file for complete search history.

(56) References Cited

U.S. PATENT DOCUMENTS

| | | | |
|---|---|---|---|
| 7,073,400 B2 | 7/2006 | Benzel et al. | |
| 8,154,527 B2 | 4/2012 | Ciesla et al. | |
| 8,621,941 B2 | 1/2014 | Mei et al. | |
| 2004/0093962 A1* | 5/2004 | Benzel | G01L 1/02 73/862.581 |
| 2009/0079706 A1* | 3/2009 | Mishima | G02F 1/13338 345/173 |
| 2011/0007023 A1* | 1/2011 | Abrahamsson | G02F 1/13338 345/174 |
| 2014/0069212 A1* | 3/2014 | Fishel | G01L 1/02 73/862.581 |
| 2016/0364056 A1* | 12/2016 | Chen | G02F 1/133308 |
| 2017/0102809 A1* | 4/2017 | Son | G06F 3/0414 |

* cited by examiner

*Primary Examiner* — Brent D Castiaux
(74) *Attorney, Agent, or Firm* — Brownstein Hyatt Faber Schreck, LLP (57) ABSTRACT

An electronic device can include a force and touch sensing system. In one embodiment, an input force sensor device of an electronic device is disclosed.

18 Claims, 9 Drawing Sheets

PRESSURE-BASED FORCE AND TOUCH SENSING

CROSS-REFERENCE TO RELATED APPLICATION(S)

This application is a nonprovisional patent application of and claims the benefit of U.S. Provisional Patent Application No. 62/480,105, filed Mar. 31, 2017 and titled "Pressure-Based Force and Touch Sensing," the disclosure of which is hereby incorporated herein by reference in its entirety.

FIELD

The described embodiments relate generally to electronic devices. More particularly, the present embodiments relate to force and touch sensing systems in electronic devices. Still more particularly, the present invention relates to pressure-based force and touch sensing to provide an input to an electronic device.

BACKGROUND

Many electronic devices, such as smart watches, smart telephones, laptop computers, and tablet computing devices include a capability to sense a force or a touch provided by a user. Input force, typically as part of a graphical user interface (GUI), can enable a variety of functionalities, such as providing differing device response for given threshold levels of user input. That is, a relatively lighter user input force may result in a first device response, while a relatively stronger or higher magnitude input force may result in a second device response. Conventional force and touch sensing systems may be performance limited in accuracy or resolution, and can require relatively high-cost components demanding significant power.

A capacitive-based force sensing system, used in many electronic devices, is illustrative of the limitations imposed by typical input force sensing systems. A pair of electrically charged capacitive elements, such as plates, are separated by a dielectric medium and electrically connected to allow monitoring of capacitance, a value that changes with separation distance between the capacitive elements. The change in capacitance is calibrated with applied force to provide input force sensing. Such systems can present operational drawbacks, such as relatively high power demands caused by the need to maintain a constant charge on the capacitive elements. However, a system that employs micro electro-mechanical elements in concert with pressure sensing may provide an input force sensor with improved performance characteristics, such as reduced power requirements, and reduced complexity and part-count, thereby increasing reliability and reducing cost.

SUMMARY

In one aspect, an input force sensor device configured for use with an electronic device is disclosed, the input force sensor device comprising: a touch surface; a cavity adjacent to the touch surface, the cavity having a cavity volume and a cavity pressure; a pressure sensor coupled with the cavity and producing a cavity pressure measurement, the cavity pressure measurement associated with the cavity volume; and a processor configured to receive the cavity pressure measurement and identify a change in the cavity pressure; wherein: a user input force applied to the touch surface is associated with a change in the cavity pressure; and the processor determines the user input force.

In one aspect, the input force sensor device further comprises a vent coupled to the cavity. In one aspect, the touch surface is a moveable touch surface. In one aspect, the input force sensor device further comprises a gasket, wherein the touch surface is disposed on the gasket. In one aspect, the input force sensor device further comprises a gasket shelf, the gasket disposed on the gasket shelf. In one aspect, the gasket forms a sealed perimeter below the touch surface. In one aspect, the pressure sensor is coupled to the gasket. In one aspect, the pressure sensor is positioned within or adjacent the cavity. In one aspect, the electronic device is a mobile device. In one aspect, the input force sensor device further comprises: a vent coupled to the cavity; and a gasket shelf disposed between the touch surface and the gasket shelf; wherein: the touch surface is a moveable touch surface configured to increase the cavity pressure with user input force; and the pressure sensor is positioned adjacent the gasket.

In another aspect, an input force sensor device for an electronic device is disclosed, the input force sensor device comprising: a cavity formed within the electronic device, the cavity defining a cavity volume and configured to maintain a cavity pressure; a moveable touch surface positioned adjacent the cavity and configured to increase the cavity pressure upon receipt of a user input force; a pressure sensor configured to output a cavity pressure measurement associated with the cavity pressure; and a processor configured to receive the cavity pressure measurement and determine the user input force.

In one aspect, the moveable touch surface decreases the cavity volume by displacing into the cavity. In one aspect, the pressure sensor is configured to output at least a first pressure measurement prior to receipt of the user input force and a second pressure measurement after or during receipt of the user input force. In one aspect, the input force sensor device further comprises a vent configured to vent the cavity to atmospheric pressure.

In another aspect, a method for determining an amount of user input force applied to a touch surface of an electronic device is disclosed, the method comprising: receiving a user input force to the touch surface; measuring a change in a cavity pressure in a cavity formed within the electronic device, the change in the cavity pressure associated with a change in a cavity volume of the cavity; and calculating the amount of the user input force applied to the touch surface, the amount of user input force associated with the measured change in cavity pressure.

In one aspect, the method further comprises the operation of measuring a baseline cavity pressure prior to the operation of receiving the user input force. In one aspect, the method further comprises the operation of venting the cavity. In one aspect, the touch surface displaces towards the cavity with user input force, and the cavity volume decreases with touch surface displacement towards the cavity. In one aspect, measuring the change in the cavity pressure comprises measuring a cavity pressure by a pressure sensor. In one aspect, measuring the change in the cavity pressure is performed by a pressure sensor disposed in the cavity.

BRIEF DESCRIPTION OF THE DRAWINGS

The disclosure will be readily understood by the following detailed description in conjunction with the accompanying drawings, wherein like reference numerals designate like elements. The elements of the drawings are not neces

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure generally relates to force and touch sensing systems in electronic devices. Input force (e.g. a force provided by a user, typically through a press or a touch by a user's finger), can serve as an input to an electronic device. An input force may provide any of several functionalities. For example, an input force may provide a simple on/off input, so as to enable button functionality. In another example, an input force may provide a scalable input to enable a varied device response for given threshold levels of imparted force. That is, a relatively lighter user input force may result in a first device response, while a relatively stronger user input force may result in a second device response.

More specifically, the disclosure relates to pressure-based force and touch sensing as an input to an electronic device. The pressure-based force and touch sensing provides an input force sensing device for use with an electronic device. When force is applied to a volume of compressible fluid, internal pressure within the fluid increases. The term "fluid" means any substance that flows or deforms under an applied shear stress, to include liquids and gases. The change in internal pressure may be calibrated to applied external force, thereby providing a pressure-based force sensor. A location of the applied external force, e.g. a location of a user input force or user input touch, may be determined with input from multiple pressure-based force sensors.

Pressure sensing provides performance and operational advantages when used for input force sensing in electronic devices. For example, pressure sensing may allow improved performance characteristics, such as reduced power requirements, and reduced complexity and part-count, thereby increasing reliability and reducing cost. Also, because very small pressure changes may be measured using a low noise pressure sensor, pressure-based force sensing allows detection of very small force inputs. Embodiments disclose a pressure-based force and touch sensing system using a measured change in cavity pressure caused by a change in cavity volume. In one embodiment, one or more components of the pressure-based force sensing system comprise micro electro-mechanical system (MEMS) components.

As one example, a cavity having a nominal air pressure may be formed adjacent or below a touch surface. More generally, the cavity may be formed in any manner that allows volume change with a force imparted to a touch surface. The cavity pressure may be monitored by a pressure sensor disposed within or adjacent the cavity. Upon a user input force, the moveable cover touch surface may descend into the cavity, causing an increase in internal cavity pressure. Because the pressure change is proportional to the change in cavity volume, which in turn is proportional to the amount of force required to move the touch surface, the amount of force exerted on the surface may be determined. This embodiment may include a barometric vent that allows restricted egress of air, and therefore may be termed a "semi-sealed system." Typically, the barometric vent permits air to enter and/or exit the cavity slowly, so that the cavity experiences an initial change in pressure due to an input force. In one embodiment, the touch surface is a cover glass.

As another example, a sealed air cavity may be formed as a channel below a moveable cover touch surface. Upon application of an input force, the touch surface may descend and press a channel cap into the channel, thereby increasing internal air pressure within the channel. A pressure sensor at the base of the channel may register one or both of an absolute pressure and the pressure change. The change in pressure, as caused by the decreased volume of cavity air, may be correlated with the force required to move the channel cap and thus a measure of the user input force may be obtained. This embodiment is one example of a "sealed system" because the working air cavity is sealed from the external environment. Thus, the air pressure within the cavity changes since the air is compressed as the cavity volume changes in response to the input force.

These and other embodiments are discussed below with reference to FIGS. 1-6. However, those skilled in the art will readily appreciate that the detailed description given herein with respect to these figures is for explanatory purposes only and should not be construed as limiting.

Figure 1:
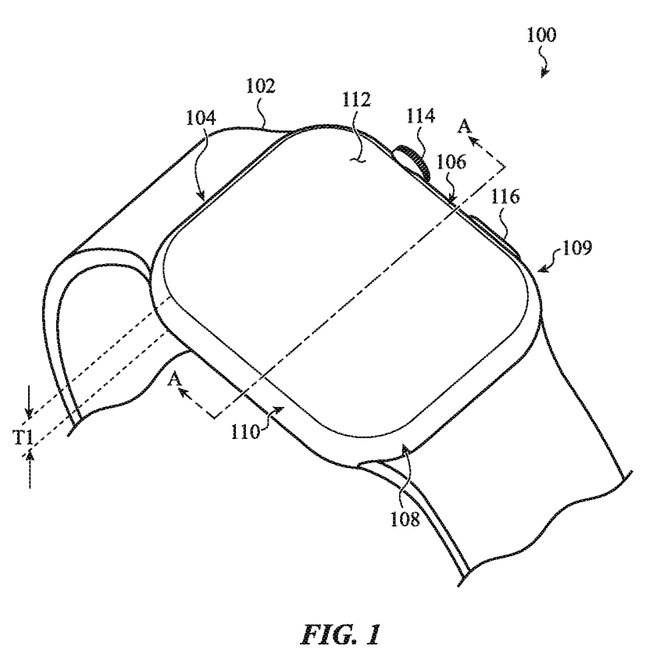
- FIG. 1 illustrates a front perspective view of one example of an electronic device with example features including cover glass, digital crown, access button, and strap.

FIG. 1 shows a front perspective view of one example of an electronic device 100, configured as a watch. The electronic device 100 may include features such as a wrist strap 102, crown 114, button 116 and cover glass 112, and comprises an enclosure 109 comprising a first side 104, second side 106, third side 108, fourth side 110, and thickness T1. These features are only example features and some or all may be omitted and/or reside in other locations. Other features are possible. The electronic device 100 can also include one or more internal components (not shown) typical of a computing or electronic device, such as, for example, one or more processors, memory components, network interfaces, and so on.

In the illustrated embodiment, a cover glass 112 is disposed over the front surface of the electronic device 100. The cover glass 112 can be made of any suitable material, including, but not limited to, glass, plastic, acrylic, sapphire, various combinations thereof, and so on. One or more portions of the cover glass 112 can define an input region for a force and touch sensing system. More specifically, an input force sensor device may be positioned below the cover glass 112 and configured to receive a user input force via the cover glass 112. Such a pressure-based sensing system feature is discussed in more detail below with respect to FIGS. 2-5.

As shown in FIG. 1, the electronic device 100 is implemented as a watch. Other embodiments, however, are not limited to this type of electronic device. Other types of computing or electronic devices can include an input region for a force sensing device, examples of which include a laptop, a netbook, a phone, a tablet computing device, a wearable computing or display device (such as glasses, jewelry, clothing or the like), a digital camera, a printer, a scanner, a video recorder, a copier, a touch screen, and the like.

The enclosure 109 can form an outer surface or partial outer surface and protective case for the internal components of the electronic device 100, and may at least partially surround the cover glass 112. The enclosure 109 can be formed of one or more components operably connected together, such as a front piece and a back piece. Alternatively, the enclosure 109 can be formed of a single piece operably connected to the cover glass 112.

The crown 114 and/or button 116 generally function as input/output (I/O) devices for the electronic device 100, and can be implemented with any type of alternative input or output member. By way of example only, the crown 114 and/or button 116 can be a switch, a button, or other input mechanism. Along with the touch screen, the crown 114 and/or button 116 allow a user to interact with the electronic device 100. The electronic device can include one or more input members or output members, and each member can have a single I/O function or multiple I/O functions. In one embodiment, the cover glass 112 receives an external input (such as a user touch) which in turn provides an input to an internal pressure-based sensing system 201. Such an embodiment is discussed in greater detail below with respect to FIGS. 2-5.

Figure 2:
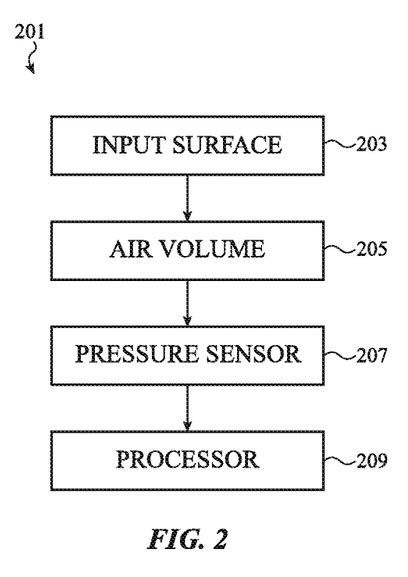
FIG. 2 illustrates an example input force sensor device according to various embodiments.

FIG. 2 illustrates an example input force sensor device 201 according to various embodiments. The input force sensor device 201 comprises a touch surface 203 such as a cover glass, a contained air volume 205, an air pressure sensor 207, and processor 209. A user applies an input force to the touch surface 203. The input force moves and/or bends the touch surface 203, resulting in a decrease in the internal air volume 205. The touch surface 203 may be directly connected to the air volume 205 or indirectly connected. For example, the touch surface 203 may be directly connected to the air volume 205 by forming an upper surface of the air volume 205. Alternatively, the touch surface 203 may be indirectly connected to the air volume 205, such as by way of a gasket.

The air volume 205 may be unsealed, semi-sealed, or fully sealed. In unsealed embodiments, a vent is provided to the air volume. The vent provides pressure equalization, and may be configured to provide a desired rate of pressure equalization. Embodiments of a semi-sealed air volume are provided as FIGS. 3A-3B, and discussed in more detail below. Embodiments of an unsealed air volume are provided as FIGS. 3C-3D, and discussed in more detail below. In semi-sealed embodiments, some controlled venting of the air volume may occur. Embodiments of a semi-sealed and sealed air volume are provided as FIGS. 4-5, and discussed in more detail below. A pressure sensor 207 measures the pressure in the internal air volume 205. The pressure sensor 207 provides or outputs or transmits at least a first air pressure measurement when no input force is provided to the touch surface 203 and the air volume 205 is in a first or nominal state, and at least a second air pressure measurement when an input force is applied to the touch surface 203 such that the air volume 205 is decreased. In one embodiment, the pressure sensor 207 provides a continuous measurement of pressure within the air volume 205. The pressure sensor 207 may provide one or both of absolute pressure and delta (or changed) pressure. A processor 209 receives the measurement output or transmitted by the pressure sensor 207. The processor 209 processes the pressure sensor 207 measurement(s) to determine one or more of an input force value applied to the touch surface 203 and the presence or absence of an input force applied to the touch surface 203. In the case of multiple pressure sensors, the processor 209 may determine a location of the force applied to the touch surface 203.

Figure 3A:
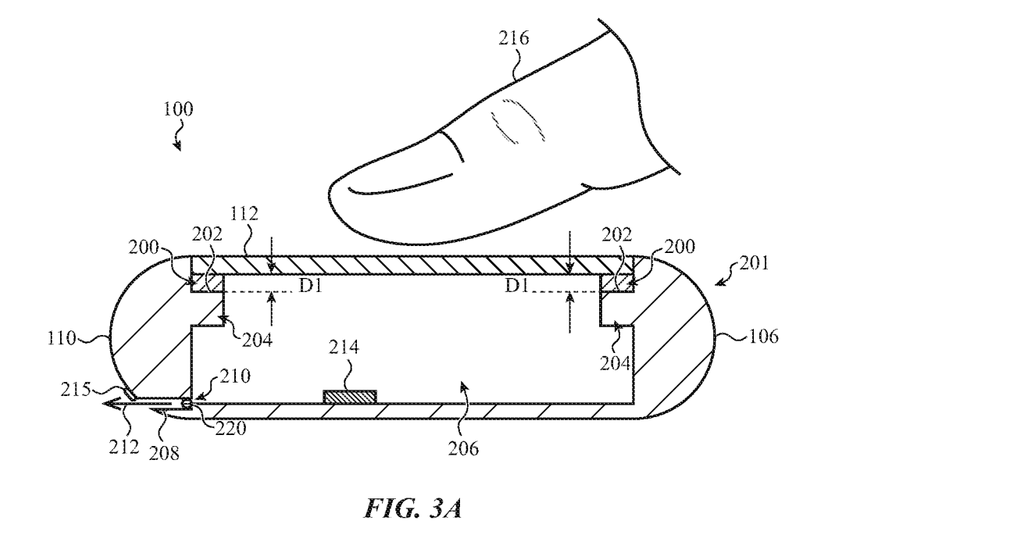
FIG. 3A is a sample cross-section view of the electronic device of FIG. 1, taken along line A-A in FIG. 1 and showing one embodiment of an input force sensor device in an undepressed state.
Figure 3B:
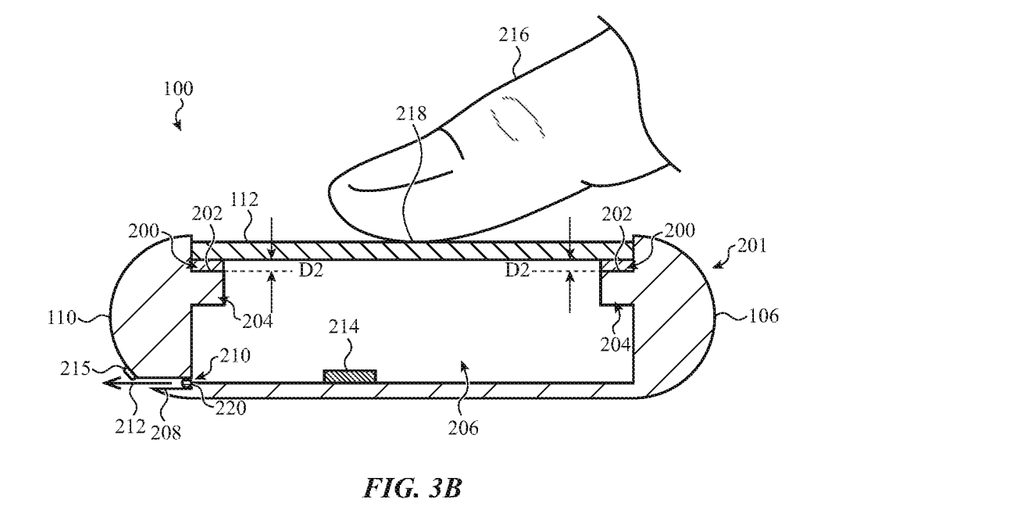
FIG. 3B is a sample cross-section view of the electronic device of FIG. 1, taken along line A-A in FIG. 1 and showing the embodiment of an input force sensor device of FIG. 3A in a depressed state.

FIGS. 3A-B are sample cross-section views of the electronic device 100 of FIG. 1, taken along line A-A in FIG. 1 and showing one embodiment of an input force sensor device 201. FIG. 3A depicts the electronic device 100 in a first state in which no input force (e.g. no input force from a user) is imparted to the electronic device 100, and FIG. 3B depicts the electronic device 100 in a second state in which input force is imparted to the electronic device 100. As shown in FIG. 3A, a cover glass 112 forms an exterior surface of the electronic device 100, and is configured to engage a user input, such as a user touch. For example, the cover glass 112 may receive an input from a user finger 216, which presses on cover glass 112 so as to impart an input force to cover glass 112. Generally, the cover glass 112 displaces upon receipt of a sufficient user input force, causing a change in cavity 206 pressure, as measured by pressure sensor 214. The change in pressure is proportional to the amount of user input force, thus providing a force sensor.

Cover glass 112 is fitted or configured to engage a perimeter of the electronic device 100. The cover glass 112 engages each of four sides of electronic device 100 along a perimeter edge of the cover glass 112. That is, the edge of the cover glass 112 engages each of device first side 104, second side 106, third side 108, and fourth side 110. The cover glass 112 may form a water tight seal with the electronic device. The cover glass 112 may form a planar surface with the edges of the electronic device 100. The perimeter edge of the cover glass 112 may form an interference fit with an inside perimeter edge of the electronic device 100. The cover glass 112 may be made of any suitable material such as sapphire, glass, plastic, and various combinations of materials.

The cover glass 112 rests on or is disposed on a gasket 200. The gasket 200 in turn rests on or is disposed on a gasket shelf 204 comprising gasket shelf surface 202. The gasket shelf 204 and gasket shelf surface 202 form an inner edge within electronic device 100 along the inner sides of the electronic device 100. The cover glass 112 is shaped or configured to snuggly fit or engage the gasket shelf 204 along the upper sides of the electronic device 100. The gasket shelf 204 is shaped or configured to generally conform to the external shape or geometry of the electronic device 100. For example, the gasket 200 may generally be shaped as a rectangle with rounded corners, reflecting the shape of the electronic device 100 of FIG. 1. The gasket 200 may be adhered, e.g. glued, to one or more of the cover glass 112 and the gasket shelf surface 202.

The gasket 200 is formed of a material with elastic properties, comprising a gasket with stiffness Kg. The gasket 200 is nominally of height D1 when the electronic device 100 is in a first or nominal state in which no user input force is applied to the cover glass 112, e.g. the configuration of the electronic device 100 as depicted in FIG. 3A. The gasket 200 decreases in height upon a user input force imparted to the electronic device 100. For example, as depicted in FIG. 3B, upon a user input force imparted onto cover glass 112, the cover glass 112 displaces downward or toward the cavity 206 wherein the gasket 200 elastically reduces in height to a height of D2. Note that upon removal of the user input force depicted in FIG. 3B, the gasket 200 returns from a reduced height of D2 to the nominal height of D1, and the cover glass 112 ascends away from the cavity 206 to return to a nominal position as shown in FIG. 3A.

The cavity 206 of electronic device 100 is formed within the electronic device 100 and defines a volume. The cavity 206 is notionally filled with air at atmospheric pressure and contains at least one pressure sensor 214. The volume of air contained within the cavity 206 changes as a function of movement of the cover glass 112. That is, the volume of air contained within the cavity 206 decreases with the downward movement of the cover glass 112. For example, the cavity 206 volume will define a first value V1 when the cover glass 112 is in a nominal state, such as that depicted in FIG. 3A, wherein no user input force is applied to the cover glass 112, and defines a second, and lower, value V2 when the cover glass 112 moves downward or descends into the electronic device 100 (and in turn, into the cavity 206.)

The amount of user input force imparted to the cover glass 112 may be determined by simultaneously solving two equations governing the relationships between cavity pressures, user input force applied, and gasket rigidity.

The ideal gas law allows the vertical displacement of the cover glass to be solved given knowledge of the cavity geometry and measurement of the cavity pressure before and after the user input force is applied. Assume a first state of cavity air in which a first user input force is applied, resulting in a cavity state with a first pressure (P1) and a first volume (V1), and a second state in which a user input force is applied with associated second pressure (P2) and second volume (V2). The ideal gas law is: $PV=nRT$, where P is pressure, V is volume, n is the molar amount of substance (here, air), R a constant, and T is the cavity temperature. Here, assuming a constant temperature and molar quantity of gas (e.g. air or any compressible fluid), $P1 \times V1 = P2 \times V2$. The cavity volume V1 is known, as defined by the cavity dimensions in the nominal state of electronic device 100. Each of P1 and P2 are known, as measured by pressure sensor 214. Two of the three dimensions of V2 are known (i.e. the average cross-sectional area of cavity 206.) The unknown is the vertical displacement of the cover glass 112. That is, with respect to FIGS. 3A-B, the vertical displacement of the cover glass 112 shown as D1-D2. Thus, $P1 \times V1 = P2 \times V2$ may be solved to determine displacement $\Delta D$. Note that the above calculations, such as the application of the ideal gas law for the $P1 \times V1 = P2 \times V2$ balance equation, may be adjusted to account for higher-order effects or deviations from assumed conditions. For example, if structural bending of the cover glass occurs with user input force, the second volume (V2) would be less than an assumed rigid cover glass enclosure assumes. A look-up table or other calibration may be used to capture the effect of such structural bending.

A force balance equation links the user input force applied, Fa, to the cover glass 112 vertical displacement $\Delta D$ (as determined above), change in cavity pressure P2-P1 (as measured by pressure sensor 214), and gasket 200 stiffness Kg. That is, $(P2-P1) \sim Fa-Kg\ (\Delta D)$. Thus, Fa may be correlated with the known values (P2-P1), Kg, and $\Delta D$. Note that because the above force balance equation describes a proportional relationship, a calibration is required between (P2-P1) and Fa-Kg ($\Delta D$) to determine the numeric value of Fa.

The cavity 206 is ported to the atmosphere via control valve 220 fitted to port 210 formed by cavity bleed vent 208. Control valve 220 allows air contained within cavity 206 to egress the cavity 206 as port air egress 212, and also air pressure equalization within cavity 206. That is, the air within cavity 206 will, when the device is in a steady state, return to ambient or atmospheric air pressure. However, during transient periods of the electronic device, e.g. during a transition from no user input force of cover glass 112 to a non-zero user input force on cover glass 112, the cavity 206 air pressure will not be at ambient air pressure. Such transient periods allow, for example, the pressure sensor 214 to measure a heightened or increased pressure within cavity 206 as caused by a reduction in cavity volume 206, as described above. Pressure equalization may be characterized by the following equation: $\Delta P \sim [(Pv)\dot{x}+(\dot{P}v)x]^2$, where x is vertical displacement. Because of the venting of the cavity 206 to atmosphere, the embodiment of the pressure-based sensing system of FIGS. 3A-B may be more useful for measuring instantaneous or discrete force inputs to cover glass 112, versus measurement of continuous or steady force input. Control valve 220 may be configured to cause a selectable equalization rate.

The input force sensor device 201 may also include an external pressure sensor 215. The external pressure sensor 215 may be disposed on an exterior of the device 100, such as on the fourth side 110 and adjacent the cavity bleed vent 208. Other locations for the external pressure sensor are possible, to include any exterior surface of the device 100. The external pressure sensor 215 may also be disposed within the device 100, such as within the cavity 206, if in communication with the exterior air pressure. For example, the external pressure sensor 215 may be engaged with the port 210 to receive a measure of exterior air pressure. An external pressure sensor 215 disposed within the device 100 may measure atmospheric pressure with little or no equalization time. In one embodiment, the external pressure sensor 215 is disposed on or adjacent a main logic board of the device 100.

A measure of outside air pressure, as provided by the external pressure sensor 215, enables any of several additional functionalities, to include calibration of the force and touch sensing algorithms given changes in outside air pressure. For example, the input force sensor device 201 may be calibrated for operations at sea level and assume a sea level atmospheric pressure of 101 kPa. However, changes in atmospheric pressure, caused by weather changes or elevation changes, will affect the force response profile. For example, the input force sensor device 201 may be more or less sensitive to user inputs for given changes in atmospheric pressure, possibly prematurely reaching a saturation point in which force or touch may not be measureable. A measure of the external pressure, by way of the external pressure sensor 215, enables the force and touch sensing algorithms to be adjusted or re-calibrated to account for atmospheric pressure changes. The ability to adjust the force and touch sensing algorithms for changes in atmospheric pressure may thus extend the environmental operational range of the device 100. In one embodiment, the input force sensor device 201, with aid of the external pressure sensor 215, may operate in atmospheric pressures ranging between 70 kPa and 110 kPa, inclusive.

In one embodiment, the cover glass 112 does not, or only minimally does, rigidly move in a vertical direction, as depicted in FIGS. 3A-B, but instead principally flexes or bends inward (toward the cavity 206.) Such a bending creates a decrease in volume of cavity 206, thereby enabling the same determination of user input force caused by a decrease in cavity volume. In one embodiment, the cover glass 112 both displaces in a vertical direction and flexes or bends.

In another embodiment, a portion of the enclosure 109 may deform to cause a pressure change in the internal cavity 206, thereby providing a touch input. For example, an area on the second side 106 of the enclosure 109 may be formed of an elastic material which depresses into the internal cavity 206, in turn causing a pressure change and allowing the (side) touch input to be sensed. Furthermore, if the touch input actuation distance were monitored or limited to a fixed distance (thereby controlling and defining the resulting pressure change), the side touch input could be distinguished from an input force applied to the cover glass 112. In this manner, a combined touch and force sensor could be provided.

The performance characteristics of the embodiment of the pressure-based sensing system of FIGS. 3A-B may be adjusted with design of any of several components. For example, a gasket 200 with less rigidity or less stiffness, i.e. that is more compliant, will provide an increase in pressure response, i.e. provide an increase in $\Delta P$. Also, a cavity 206 of relatively reduced volume will result in increased sensitivity of the delta pressure measurement.

Figure 3C:
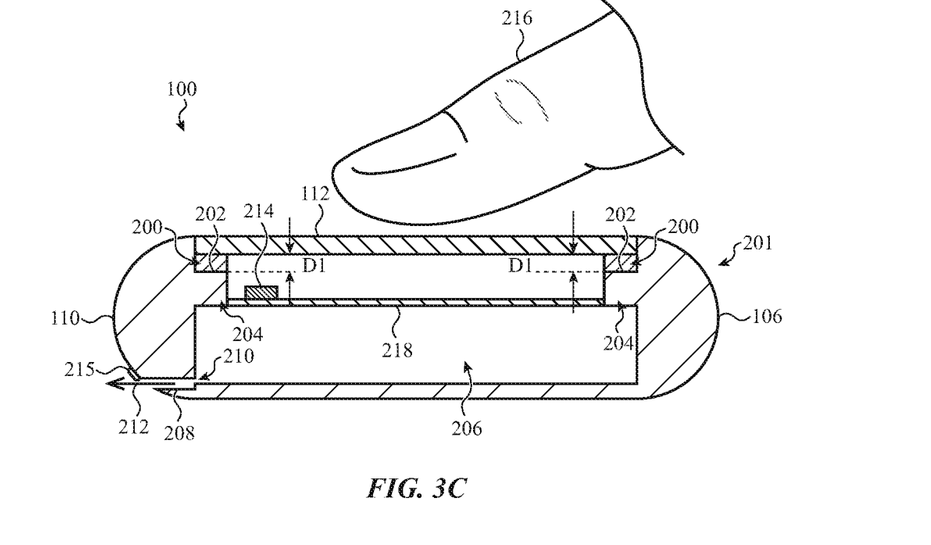
FIG. 3C is a sample cross-section view of the electronic device of FIG. 1, taken along line A-A in FIG. 1 and showing another embodiment of an input force sensor device in an undepressed state.
Figure 3D:
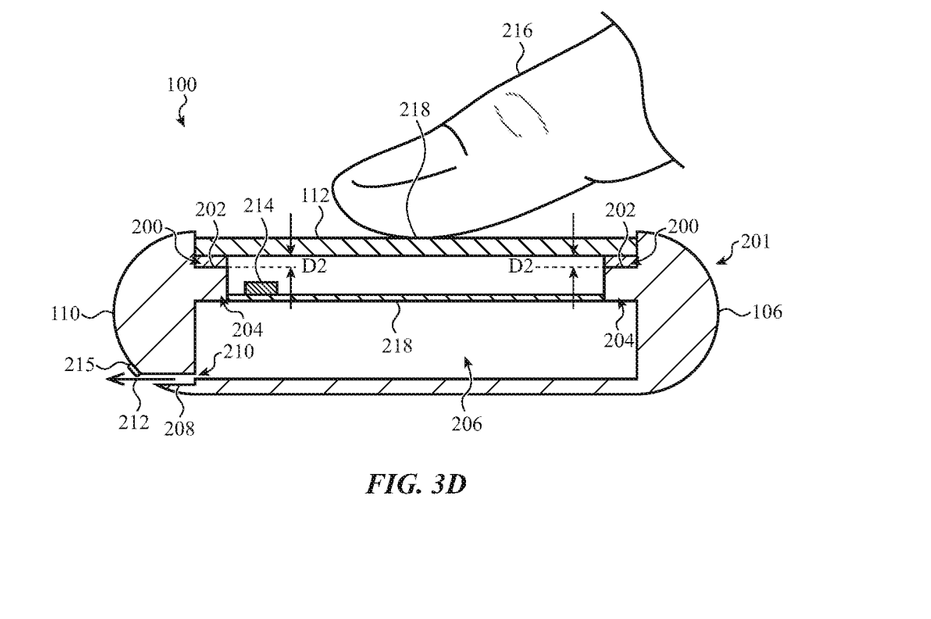
FIG. 3D is a sample cross-section view of the electronic device of FIG. 1, taken along line A-A in FIG. 1 and showing the embodiment of an input force sensor device of FIG. 3C in a depressed state.

FIGS. 3C-D are sample cross-section views of the electronic device 100 of FIG. 1, taken along line A-A in FIG. 1 and showing another embodiment of an input force sensor device 201. FIG. 3C depicts the electronic device 100 in a first state in which no input force (e.g. no input force from a user) is imparted to the electronic device 100, and FIG. 3D depicts the electronic device 100 in a second state in which input force is imparted to the electronic device 100.

The embodiment of FIGS. 3C-D is similar to the embodiment of FIGS. 3A-B except that a shelf 218 and cavity bleed vent 208 are fitted within device 100. The shelf 218 decreases the volume of air contained within the air cavity 206 relative to that of the embodiment of FIGS. 3A-B. The cavity bleed vent 208 fluidly connects the air contained in cavity 206 to the port 210, thus allowing air pressure equalization of cavity 206. Shelf 218 is positioned adjacent the gasket shelf 204. One or more pressure sensors 214 are disposed on the shelf 218. The same mathematical constructs apply to the embodiment of FIGS. 3C-D as to the embodiment of FIGS. 3A-B. The embodiment of FIGS. 3C-D provides a relatively more sensitive input force sensor device 201 than that of FIGS. 3A-B because a reduced volume of air is contained in an upper cavity.

Figure 4A:
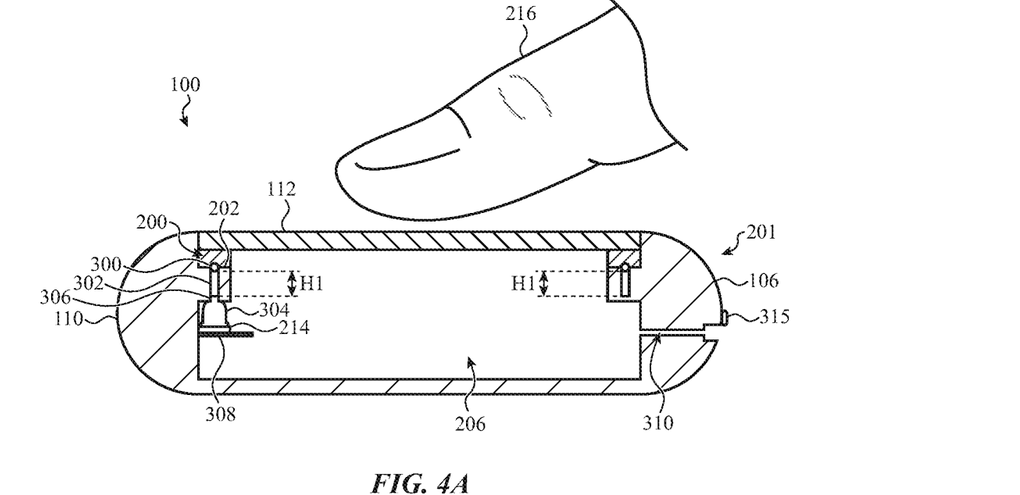
FIG. 4A is a sample cross-section view of the electronic device of FIG. 1, taken along line A-A in FIG. 1 and showing another embodiment of an input force sensor device in an undepressed state.
Figure 4B:
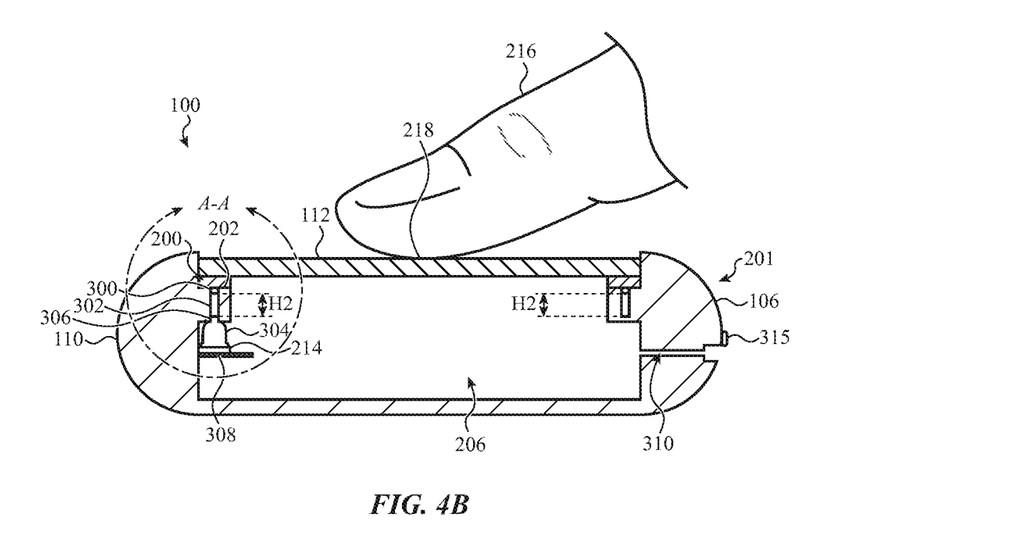
FIG. 4B is a sample cross-section view of the electronic device of FIG. 1, taken along line A-A in FIG. 1 and showing the embodiment of an input force sensor device of FIG. 4A in a depressed state.

FIGS. 4A-B are sample cross-section views of the electronic device 100 of FIG. 1, taken along line A-A in FIG. 1 and showing another embodiment of an input force sensor device 201. FIG. 4A depicts the electronic device 100 in a first state in which no user input force is imparted to the electronic device 100, and FIG. 4B depicts the electronic device 100 in a second state in which a user input force is imparted to the electronic device 100. FIGS. 5A-D are detailed views of a portion of the embodiment of the input force sensor device 201 of FIG. 4B. Generally, similar to the embodiment of FIGS. 3A-B, the cover glass 112 displaces upon receipt of a sufficient user input force, causing a change in a measured pressure, as sensed by pressure sensor 214. The change in pressure is proportional to user input force, thus providing a force sensor.

In comparison to the embodiment of FIGS. 3A-B, which measures a change in pressure within cavity 206, the embodiment of FIGS. 4-5 measures a change in pressure of a sealed channel 302. The sealed channel 302 is disposed below a gasket 200, the gasket 200 imparting a change in internal pressure to the air contained within the channel 302 caused by a user input force to cover glass 112.

As shown in FIG. 4A, a cover glass 112 forms an exterior surface of the electronic device 100, and is configured to engage a user input force. For example, the cover glass 112 may receive an input from a user finger 216, which presses on cover glass 112 so as to impart a force to cover glass 112.

The cover glass 112 is fitted or configured to engage a perimeter of the electronic device 100, similar to that of the embodiment of FIGS. 3A-B. The cover glass 112 engages each of four sides of electronic device 100 along a perimeter edge of the cover glass 112. That is, the edge of the cover glass 112 engages each of device first side 104, second side 106, third side 108, and fourth side 110. The cover glass 112 may form a water tight seal with the electronic device. The cover glass 112 may form a planar surface with the edges of the electronic device 100. The perimeter edge of the cover glass 112 may form an interference fit with an inside perimeter edge of the electronic device 100. The cover glass 112 can be made of any suitable material such as sapphire, glass, plastic, and various combinations of materials.

The cover glass 112 rests on or is disposed on or is interconnected with a gasket 200, similar to the arrangement of FIGS. 3A-B. The gasket 200 in turn rests on or is disposed on or is interconnected with a gasket shelf 204 comprising gasket shelf surface 202. The gasket shelf 204 and gasket shelf surface 202 form an inner edge within electronic device 100 along the inner sides of the electronic device 100. The cover glass 112 is shaped or configured to snuggly fit or engage the gasket shelf 204 along the upper sides of the electronic device 100. The gasket shelf 204 is shaped or configured to generally conform to the external shape or geometry of the electronic device 100. For example, the gasket shelf 204 may generally be shaped as a rectangle with rounded corners, reflecting the shape of the electronic device 100 of FIG. 1. The gasket 200 may be adhered, e.g. glued, to one or more of the cover glass 112 and the gasket shelf surface 202.

In contrast to the embodiment of FIGS. 3A-B, the gasket shelf 204 contains a channel 302, configured to contain a gas, such as air. The channel 302 forms a ring shape when viewed from above (see, e.g. FIG. 6A.) The channel 302 is formed within the gasket shelf 204, and is fitted with a channel cap 300. The channel cap 300 is disposed at the upper or first end of the channel 302, and engages the gasket 200. When the gasket 200 is compressed, such as caused by a user input force to cover glass 112, the gasket imparts a force to the channel cap 300, causing the channel cap 300 to press inward toward the channel 302, thereby increasing the fluid pressure of the air contained within the channel 302. At least one pressure sensor 214 is fitted below a portion of the channel 302, so as to measure or sense the pressure within the channel 302.

The channel cap 300 may be circularly shaped in cross-section, as depicted in FIG. 4A. In other embodiments, the channel cap 300 may be configured with other cross-sectional shapes, such as ovals or rectangles, or any shape that will function to receive a force from the gasket 200 and translate or relay that force to cause a pressure change to the air contained within the channel 302. The channel cap 300 may be of a rigid material that minimally or does not deform upon receipt of force from the gasket 200. The channel cap 300 may be of an elastic material that deforms when a force is applied, such as from the gasket 200. For example, the channel cap 300 depicted in FIGS. 4A-B deforms from a cross-sectional nominal circular shape in FIG. 4A to an oval shape upon receipt of loading in FIG. 4B. In one embodiment, the gasket 200 forms a channel cap 300 feature on a lower surface of the gasket 200 and no separate channel cap 300 element is provided. The gasket 200 is formed of a material with elastic properties, comprising a gasket stiffness Kg.

Upon a user input force applied to cover glass 112, the channel cap 300 descends or lowers into the channel 302, thereby increasing the pressure of the air contained within the sealed channel 302. The air contained within the sealed channel 302 is of a first or nominal height H1 when the electronic device 100 is in a first or nominal state in which no user input force is applied to the cover glass 112, e.g. the configuration of the electronic device 100 as depicted in FIG. 4A. Upon a user input force onto cover glass 112, the cover glass 112 displaces downward or toward the channel 302 wherein the channel cap displaces downward and the air contained within the sealed channel 302 decreases to a second height of H2 (See FIG. 4B.) Note that upon removal of the user input force depicted in FIG. 4B, the gasket 200 returns from a reduced height to a nominal height, the channel cap 300 moves from a descended position to a nominal position, and the cover glass 112 ascends away from the cavity 206 to return to a nominal position as shown in FIG. 4A.

Figure 6A:
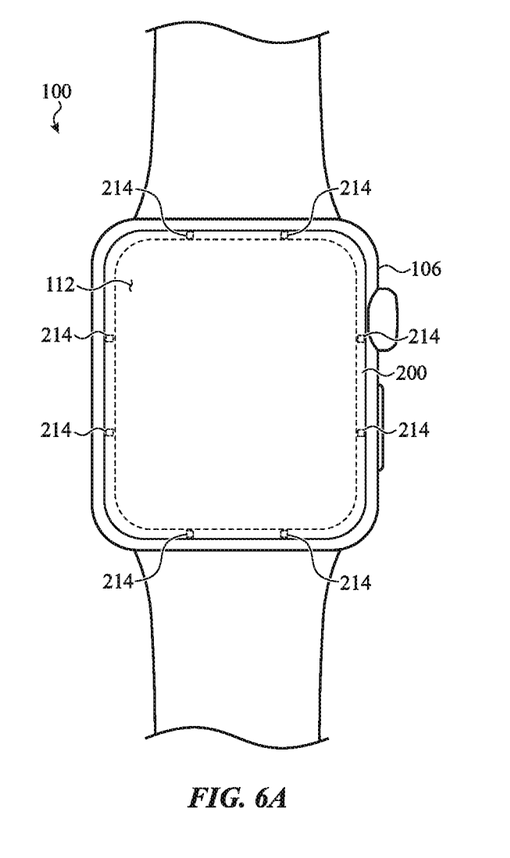
FIG. 6A illustrates a front view of the electronic device of FIG. 1 and showing one embodiment of an input force sensor device similar to that of FIGS. 4A-B and comprising a plurality of pressure sensors.
Figure 6B:
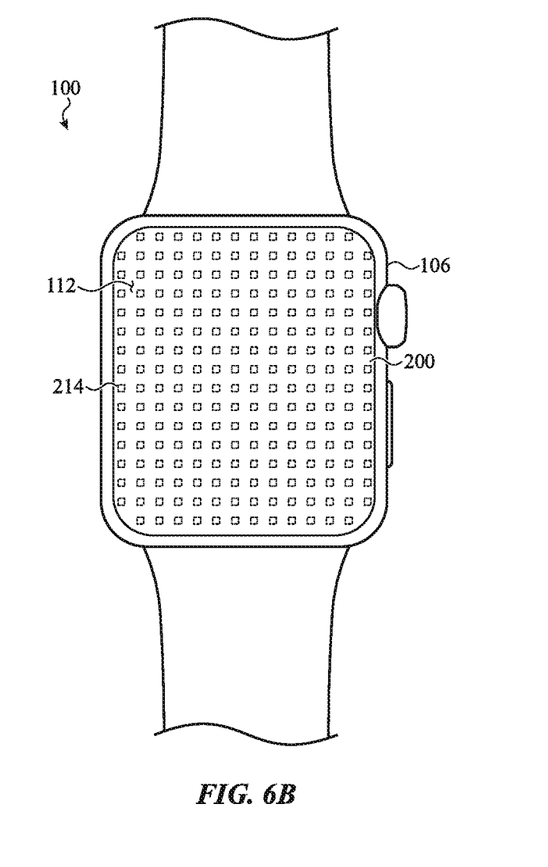
FIG. 6B illustrates a front view of the electronic device of FIG. 1 and showing another embodiment of an input force sensor device similar to that of FIGS. 4A-B and comprising a plurality of pressure sensors assembled in a matrix.

At least one pressure sensor 214 is disposed below the sealed channel 302, and in communication with the air contained in the sealed channel 302, so as to sense or measure pressure of the channel air. The pressure sensor 214 may be disposed on a pressure sensor shelf 308. The pressure sensor 214 may be in direct fluid communication with the air contained in the sealed channel 302, or may be engaged with a channel lid 304 (as depicted in FIGS. 4A-B.) The channel lid 304 may comprise a channel lid extension 306 which extends into the channel 302. The channel lid 304 may be advantageous, for example, in assembly of the pressure-based sensing system 201 in fitting the pressure sensor 214 below the channel 302. The channel lid 304 may reduce thermal communication between thermal loads external to the channel and the air in the channel. Additional pressure sensors 214 may be fitted to sense pressure within the channel 302, as shown in FIGS. 6A-B.

The same mathematical constructs apply to the embodiment of FIGS. 4-5 as to the embodiment of FIGS. 3A-B. That is, the amount of user input force imparted to the cover glass 112 may be determined by simultaneously solving two equations governing the relationships between channel pressures, user input force applied, and gasket rigidity. Briefly, the channel 302, in a first state (wherein no input force is applied to cover glass 112), is of notional volume V1 and at pressure P1. The volume of air contained within the channel 302 changes as a function of movement of the cover glass 112. That is, the volume of air contained within the channel 302 decreases with the downward movement of the cover glass 112. For example, the channel 302 volume will define a first value V1 when the cover glass 112 is in a nominal state, such as that depicted in FIG. 4A, wherein no user input force is applied to the cover glass 112, and defines a second, and lower, value V2 when the cover glass 112 moves downward or descends into the electronic device 100 (and in turn, the channel cap 300 descends into the channel 302.) The ideal gas equation, and a force balance equation, as described above with respect to FIGS. 3A-B, are then used to determine the input force applied.

The embodiment of FIGS. 4A-B may comprise a barometric vent 310 and vent seal 312, which enable controlled venting of air in the cavity 206. Note that the input force sensor device 201 of FIGS. 4A-B remains a sealed or water-tight system (e.g. the channel 302 and contained air is sealed.)

The input force sensor device 201 may also include an external pressure sensor 315. The external pressure sensor 315 may be disposed on an exterior of the device 100, such as on the second side 106 and adjacent the barometric vent 310. Other locations for the external pressure sensor are possible, to include any exterior surface of the device 100. The external pressure sensor 315 may also be disposed within the device 100, such as within the cavity 206, if in communication with the exterior air pressure. For example, the external pressure sensor 315 may be engaged with the barometric vent 310 to receive a measure of exterior air pressure. A measure of the external pressure, by way of the external pressure sensor 315, enables the input force sensor device 201 to be adjusted or re-calibrated to account for atmospheric pressure changes, similar to that described above regarding the embodiment of FIGS. 3A-3B.

Because of the channel is sealed, the embodiment of FIGS. 4A-B measures both continuous (analog) and discrete force inputs, and is devoid of the limitations in measuring continuous force measurements of the embodiment of FIGS. 3A-B.

Figure 5A:
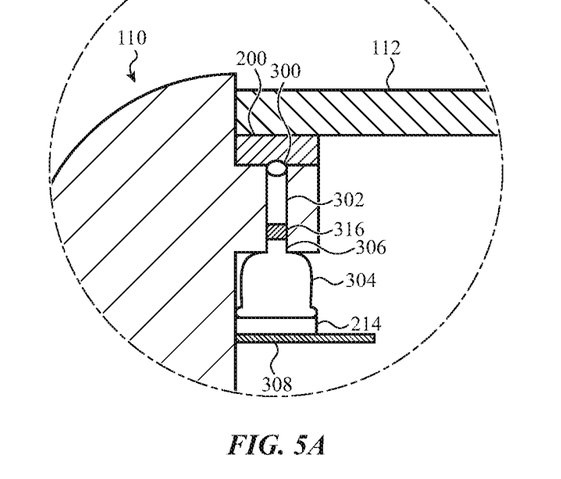
FIG. 5A is a sample detail view A-A of the sample cross-section view of FIG. 4B of the electronic device of FIG. 1 and showing one embodiment of a cavity gel feature.

FIGS. 5A-D present detailed views of alternate embodiments of a portion of the input force sensor device 201 of the embodiment of FIGS. 4A-B. Specifically, FIG. 5A depicts an embodiment of the sealed channel input force sensor device 201 of FIGS. 4A-B wherein the channel 302 is at least partially filled with a channel gel 316. The channel gel 316 serves to reduce the operative volume of air contained in the channel 302, which increases the sensitivity of a measured change in pressure (by pressure sensor 214) for a given input force applied. The application of a channel gel 316 to a channel 302 to reduce the operative air volume may be preferred over a similarly reduced-sized channel in that a larger channel may be more easily manufactured. In addition to a gel material, other "fill" materials may be used, to include a paste or hardened material.

Figure 5B:
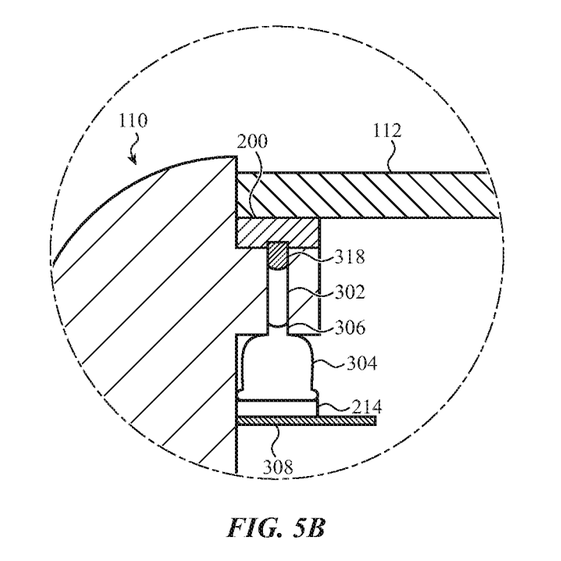
FIG. 5B is a sample detail view A-A of the sample cross-section view of FIG. 4B of the electronic device of FIG. 1 and showing one embodiment of a cavity actuator feature.

FIG. 5B depicts an embodiment of the sealed channel input force sensor device 201 of FIGS. 4A-B wherein the channel cap 300 is replaced with a channel actuator 318. The channel actuator 318 may extend into the channel so as to reduce the operative air volume in the channel 302, thus providing similar benefits as those described above with respect to the channel gel 316 of FIG. 5A. The channel actuator 318 of FIG. 5B is fitted with a distal end conforming to the channel lid extension 306.

Figure 5C:
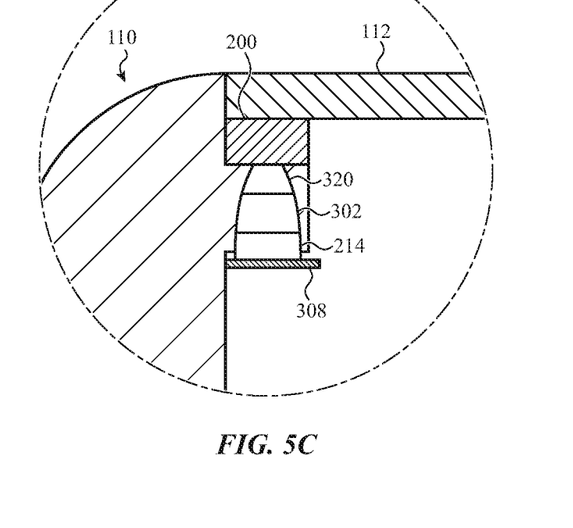
FIG. 5C is a sample detail view A-A of the sample cross-section view of FIG. 4B of the electronic device of FIG. 1 and showing one embodiment of a cavity bladder feature in an undepressed state.
Figure 5D:
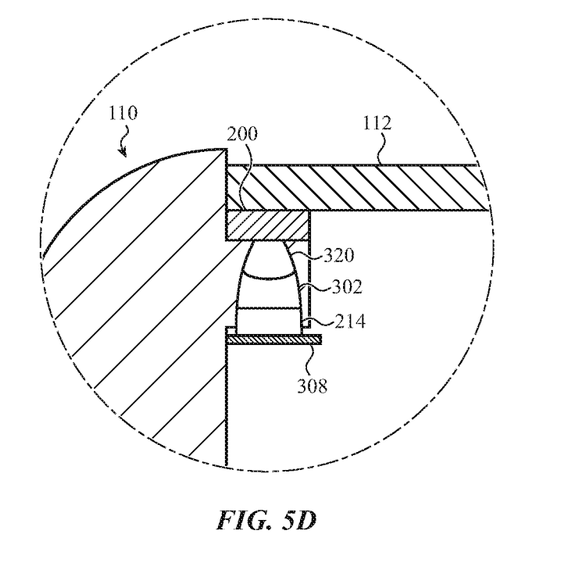
FIG. 5D is a sample detail view A-A of the sample cross-section view of FIG. 4B of the electronic device of FIG. 1 and showing one embodiment of a cavity bladder feature of FIG. 5C in a depressed state.

FIGS. 5C-D depict an embodiment of the sealed channel input force sensor device 201 of FIGS. 4A-B comprising a cavity bladder 320. FIG. 5C depicts the electronic device 100 in a first state in which no user input force is imparted to the electronic device 100, and FIG. 5D depicts the electronic device 100 in a second state in which a non-zero input force is imparted to the electronic device 100. A pressure sensor 214 is disposed on a shelf 308, the pressure sensor 214 fitted below a channel 302. Above the channel 302 is a cavity bladder 320 disposed below a gasket 200. The gasket 200 imparts a force onto the cavity bladder which in turn decreases air contained in channel 302, resulting in an increase in pressure as sensed by pressure sensor 214. Note that the bladder 320 bows upon receipt of pressure imparted by the gasket 200. The bladder may be filled with a gel material, a fluid such as air, or a combination thereof.

In one embodiment, the fluid contained within the channel 302 is a fluid other than air, such as an inert gas. Such an alternative gas may provide improved performance of the pressure-based sensing system 201. For example, a particular gas may better preserve the elastic properties of the gasket 200 and/or the channel cap 300.

In one embodiment, the channel 302, and/or the cavity 206, is fitted with a temperature sensor, so as to enable adjustments to the calculations of user input force applied (because the ideal gas law depends on temperature, e.g., the determination of user input force applied is temperature dependent.) The temperature sensor may be configured as an integral part of a component of the input force sensor device 201, such as the pressure sensor 214. In one embodiment, the channel 302, and/or the cavity 206, is fitted with a heating and/or cooling device, so as to modulate the temperature within the channel 302 and/or cavity 206, respectively.

FIGS. 6A-B depict the electronic device 100 with a plurality of pressure sensors 214 in embodiments of the input force sensor device 201 similar to the embodiment of FIGS. 3A-B. In FIG. 6A, a set of eight pressure sensors 214 are depicted as disposed below the channel 302. In FIG. 6B, a matrix of pressure sensors 214 are depicted across substantially all of the cover glass 112 of the device 100. Other configurations are possible, such as an increased number of pressure sensors and alternate locations for the pressure sensors.

The use of more than one pressure sensors may provide any of several benefits and/or functionalities. For example, an increase in pressure sensors provides redundancy in the event of failure of a pressure sensor. Also, additional pressure sensors enable a multitude of pressure measurements to be obtained, thereby allowing blending of sensor measurements (e.g. averaging of sensor measurements) which typically increasing measurement robustness.

A distributed set of multiple pressure sensors may also enable position data to be determined based on differential pressure readings from a plurality of pressure sensors. Generally, an input force will not generate a uniform input force across the entirety of a touch surface. Instead, the input force will be slightly greater in the vicinity of the input force, resulting in a correspondingly increased pressure sensor reading. For example, with reference to FIG. 6A, a force input at the upper middle of the cover glass 112 would generate a higher force value sensed by the two adjacent pressure sensors 214 at the upper edge portion of the cover glass 112 than the two pressure sensors 214 located at the lower edge portion of the cover glass 112. The disparity in the input force may be caused by any of several factors, to include localized bending of the touch surface (e.g. bending of a cover glass surface in a localized region surrounding the input force) and rotation of the plane of the touch surface toward the input force location.

Based on the difference in pressure values sensed by distributed pressure sensors for a given input force, the location of the input force may be determined. For example, with attention to FIG. 6A, if an input force was applied exactly in the middle of cover glass 112, each of the eight pressure sensors 214 would theoretically provide the same pressure measurement. That is, if the cover glass 112 was a perfectly rigid panel and uniformly descended into a pressure cavity of the device, each (ideal) pressure sensor would record a common pressure reading. However, because of the non-uniformities identified above, the set of pressure sensors would not provide an identical pressure reading. With focus on non-uniformities caused by cover glass deflection, the rectangular shape of the cover glass 112 of FIG. 6A would cause a varied set of pressure readings from the pressure sensors 214. Because the cover glass 112 is of a rectangular shape, the upper and lower set of sensors are slightly farther away from the input force than the set of sensors located on each side of the cover glass 112. Thus, a force input exactly in the middle of the cover glass 112 will produce a slightly lower pressure reading in the upper and lower set of pressure sensors than the pressure sensors located on the right and left sides of the cover glass, because the cover glass would bend (upwardly) slightly more in the upper and lower regions of the cover glass than the left and right sides, and therefore descend slightly less into the cavity and produce a lower pressure reading. By calibrating the set of pressure sensors as a function of input force location, input force location may be determined from the varied readings of the set of pressure sensors. It is noted that at least three pressure sensors would be required to uniquely determine a force input location of the cover glass; such triangulation of position based on relative force input at three or more locations is well known in the art.

Additionally or alternatively to the calibration scheme discussed above, force balance equations may be applied to determine relative loading on the cover glass (and the correspondingly positioned pressure sensors) as a function of input force location. Such calculations would require knowledge of structural characteristics of the cover glass, e.g. stress-strain relationships. Such force balance equations and associated calculations are well known in the art.

In the embodiment of FIG. 6B, similar calibration or force-balance schemes may be employed to determine input force location based on three or more pressure sensor readings. However, the matrix of pressure sensors covering the entire cover glass plane affords another means to determine force location not available in the embodiment of FIG. 6A. That is, depending on the accuracy of force location desired, a simple scheme wherein the highest pressure sensed by a given pressure sensor 214 in the pressure sensor array may be determinate of the force location input.

Also, the embodiments of FIGS. 6A-B may enable a movement of input force to be determined. For example, if an upper right pressure sensor is first triggered, followed by a lower left pressure sensor, it may be determined that the user is swiping the cover glass from the upper right to the lower left. It is noted that in the embodiments of FIGS. 6A-B, each pressure sensor 214 may be connected to a processor by way of a separate communication channel.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An input force sensor device for use with an electronic device, the input force sensor device comprising:
    a touch surface;
    a cavity adjacent to the touch surface, the cavity having a cavity volume and a cavity pressure;
    a gasket set adjacent to the touch surface, the gasket set configured to deform in response to a user input force, the deformation providing a change in the cavity volume;
    a pressure sensor coupled with the cavity and producing a cavity pressure measurement, the cavity pressure measurement associated with the cavity volume;
    a vent coupling the cavity volume to an ambient environment; and
    a processor configured to receive the cavity pressure measurement and identify a change in the cavity pressure; wherein:
        the user input force applied to the touch surface is associated with a change in the cavity pressure; and
        the processor uses the change in the cavity pressure to identify an amount of the user input force.

2. The input force sensor device of claim 1, wherein the touch surface is a moveable touch surface.

3. The input force sensor device of claim 2, wherein the touch surface is disposed on the gasket.

4. The input force sensor device of claim 3, further comprising a gasket shelf, the gasket disposed on the gasket shelf.

5. The input force sensor device of claim 3, wherein the gasket forms a sealed perimeter below the touch surface.

6. The input force sensor device of claim 3, wherein the pressure sensor is coupled to the gasket.

7. The input force sensor device of claim 1, wherein the pressure sensor is positioned within or adjacent the cavity.

8. The input force sensor device of claim 1, wherein the electronic device is a mobile device.

9. The input force sensor device of claim 1, further comprising:
    a vent coupled to the cavity;
    wherein:
    the gasket is disposed between the touch surface and a gasket shelf; and
    the touch surface is a moveable touch surface configured to increase the cavity pressure with user input force; and
    the pressure sensor is positioned adjacent the gasket.

10. An input force sensor device for an electronic device, comprising:
    a cavity formed within the electronic device, the cavity defining a cavity volume and configured to maintain a cavity pressure;
    a moveable touch surface positioned adjacent the cavity and configured to increase the cavity pressure upon receipt of a user input force;
    a gasket adjacent to the moveable touch surface, wherein the gasket is configured to deform in response to the user input force, the deformation providing a change in the cavity volume;
    a pressure sensor configured to output a cavity pressure measurement associated with the cavity pressure;
    a vent to an ambient environment, the vent in communication with the cavity volume; and
    a processor configured to receive the cavity pressure measurement and use the cavity pressure measurement to identify an amount of the user input force.

11. The input force sensor device of claim 10, wherein the moveable touch surface decreases the cavity volume by displacing into the cavity.

12. The input force sensor device of claim 10, wherein the pressure sensor is configured to output at least a first pressure measurement prior to receipt of the user input force and a second pressure measurement after or during receipt of the user input force.

13. A method for determining an amount of user input force applied to a touch surface of an electronic device, comprising:
    receiving a user input force to the touch surface;
    deforming at least one gasket located adjacent to the touch surface in response to the user input force, the deformation of the at least one gasket providing a change in a cavity volume of a cavity;
    measuring a change in a cavity pressure in the cavity formed within the electronic device, the cavity vented to an ambient environment, the change in the cavity pressure associated with a change in the cavity volume of the cavity; and calculating the amount of the user input force applied to the touch surface, the amount of user input force associated with the measured change in cavity pressure.

14. The method of claim 13, further comprising the operation of measuring a baseline cavity pressure prior to the operation of receiving the user input force.

15. The method of claim 13, further comprising the operation of venting the cavity.

16. The method of claim 13, wherein:
the touch surface displaces towards the cavity with the user input force; and
the cavity volume decreases with touch surface displacement towards the cavity.

17. The method of claim 13, wherein measuring the change in the cavity pressure comprises measuring a cavity pressure by a pressure sensor.

18. The method of claim 13, wherein measuring the change in the cavity pressure is performed by a pressure sensor disposed in the cavity.

* * * * *